United States Patent
Muetschele et al.

(10) Patent No.: US 9,692,066 B2
(45) Date of Patent: Jun. 27, 2017

(54) DEVICE FOR DISCHARGING LIQUID

(71) Applicants: Armin Muetschele, Weilheim an der Teck (DE); Sven Schmalzried, Esslingen (DE); Simon Steinhuebl, Holzmaden (DE); Harald Teves, Stuttgart (DE)

(72) Inventors: Armin Muetschele, Weilheim an der Teck (DE); Sven Schmalzried, Esslingen (DE); Simon Steinhuebl, Holzmaden (DE); Harald Teves, Stuttgart (DE)

(73) Assignee: Daimler AG, Stuttgart (DE)

( * ) Notice: Subject to any disclaimer, the term of this patent is extended or adjusted under 35 U.S.C. 154(b) by 236 days.

(21) Appl. No.: 14/373,067

(22) PCT Filed: Dec. 22, 2012

(86) PCT No.: PCT/EP2012/005367
§ 371 (c)(1),
(2) Date: Jul. 18, 2014

(87) PCT Pub. No.: WO2013/110310
PCT Pub. Date: Aug. 1, 2013

(65) Prior Publication Data
US 2014/0363480 A1    Dec. 11, 2014

(30) Foreign Application Priority Data
Jan. 24, 2012  (DE) .................. 10 2012 004 434

(51) Int. Cl.
*H01M 8/04291*    (2016.01)
*H01M 8/04119*    (2016.01)
(Continued)

(52) U.S. Cl.
CPC .......... *H01M 8/04156* (2013.01); *B01D 5/00* (2013.01); *H01M 8/04097* (2013.01);
(Continued)

(58) Field of Classification Search
CPC .......... H01M 8/04156; H01M 8/04291; H01M 2250/20; H01M 8/04164; H01M 8/04514; H01M 8/04097; H01M 8/04373
See application file for complete search history.

(56) References Cited

U.S. PATENT DOCUMENTS

2006/0088756 A1    4/2006  Sato et al.
2007/0141410 A1    6/2007  Akiyama
(Continued)

FOREIGN PATENT DOCUMENTS

DE    102008004812 A1    7/2009
DE    112007002278 T5    9/2009
(Continued)

OTHER PUBLICATIONS

International Search Report dated Jun. 24, 2013, in International Application No. PCT/EP2012/005367.
(Continued)

*Primary Examiner* — Barbara Gilliam
*Assistant Examiner* — Angela Martin
(74) *Attorney, Agent, or Firm* — Stephan A. Pendorf; Patent Central LLC

(57) ABSTRACT

A device (13) for discharging liquid water from a water separator (12) in a fuel cell system (1), having a valve device (15), a liquid sensor (16) and a control unit (17) which controls the valve device (15) depending on measured values of the liquid sensor (16). The liquid sensor (16) is arranged downstream of the valve device (15) in the flow direction.

10 Claims, 1 Drawing Sheet

(51) Int. Cl.
*B01D 5/00* (2006.01)
*H01M 8/04089* (2016.01)
*H01M 8/0432* (2016.01)
*H01M 8/04492* (2016.01)

(52) U.S. Cl.
CPC ... *H01M 8/04164* (2013.01); *H01M 8/04291* (2013.01); *H01M 8/04373* (2013.01); *H01M 8/04514* (2013.01); H01M 2250/20 (2013.01); Y02T 90/32 (2013.01)

(56) References Cited

U.S. PATENT DOCUMENTS

| | | | | |
|---|---|---|---|---|
| 2008/0026269 A1* | 1/2008 | Shurtleff | ........... | H01M 8/04007 429/414 |
| 2010/0227238 A1* | 9/2010 | Naganuma | ........ | H01M 8/04179 429/429 |

FOREIGN PATENT DOCUMENTS

| | | | | | |
|---|---|---|---|---|---|
| JP | 54118330 | A | 9/1979 | | |
| JP | 5952718 | A | 3/1984 | | |
| JP | 2005302708 | A | 10/2005 | | |
| JP | 2008177128 | A | 7/2008 | | |
| JP | 2008235051 | A | 10/2008 | | |
| JP | 2010-080434 | | * 4/2010 | ............. | H01M 8/06 |
| JP | 2010080434 | A | 4/2010 | | |

OTHER PUBLICATIONS

English language translation of Japanese Office Action dated May 19, 2015, in Japanese Patent Application No. 2014-552524.

* cited by examiner

DEVICE FOR DISCHARGING LIQUID

BACKGROUND OF THE INVENTION

Field of the Invention

The invention relates to a device for discharging liquid from a water separator in a fuel cell system according to the kind defined in greater detail in the preamble of claim 1. The invention further relates to a method for discharging liquid from a water separator in a fuel cell system by means of such a device.

Description of the Related Art

Fuel cell systems are known from the prior art. The functionality is in essence that electrical energy and product water is produced from hydrogen and oxygen. Here, the resulting product water together with exhaust gases is discharged from the region of the fuel cell. In order to separate the liquid water from these exhaust gases, water separators are typically provided in the fuel cell systems. Hereby, on the one side, liquid water can be prevented from escaping from the fuel cell system and, on the other, potential freezing of line elements due to said liquid water can be prevented if the fuel cell system is operated at temperatures below the freezing point and, in particular, if it is turned off. If exhaust gases of the fuel cell system are at least partially recirculated to the fuel cell, thus, the fuel cell system is provided with a so-called cathode and/or anode recirculation, water separators are typically also provided in the recirculation lines so that the resulting product water can be separated and is not recirculated again into the fuel cell. Here, liquid water could wet parts of the fuel cell, which would adversely affect the functionality of the fuel cell.

In particular in the case of water separators in the region of the anode of the fuel cell system it is now of vital importance that the water is discharged from time to time and that, in addition, the (residual) hydrogen present in products and reactants on the anode side cannot escape, or only in minimal amounts, into the surrounding area.

Devices for discharging liquid water are known from US 2006/0088756 A1, which devices comprise a capacitive sensor, a controller and a valve device activated by said controller. The capacitive sensor is located upstream of the valve device in the flow direction of the water to be discharged. When the valve device is closed as soon as there is no more liquid in the region of the capacitive sensor, it is then possible, with a suitable spacing between the sensor and the valve device downstream of the sensor, that leakage of gas can be completely prevented or, with an appropriately smaller spacing, can be reduced to a tolerable minimum.

The problem of this construction is that capacitive sensors for detecting liquids in fuel cell systems unfortunately have not proven their worth. It became apparent over the years in development and research systems that capacitive sensors, for example as level sensors in a water separator, or as used in the mentioned US publication, are extremely susceptible to failures. This phenomenon occurs in particular in fuel cell systems since due to the substances and contents of the liquid water involved here, the capacitive sensors are extremely difficult to use and become soiled rather quickly.

BRIEF SUMMARY OF THE INVENTION

It is an object of the present invention to propose a device for discharging liquid water from a water separator in a fuel cell system, which device avoids the aforementioned problems and ensures secure and reliable discharging of the liquid without high hydrogen emissions to the environment.

The solution according to the invention provides that, comparable to the prior art, the device comprises a liquid sensor, a valve device and a control unit that controls the valve device depending on a measured value of the liquid sensor. Unlike the prior art, the construction is selected here such that the sensor is arranged downstream of the valve device in the flow direction. This allows that the sensor comes into contact with liquid only if the liquid is discharged correspondingly. Thus, since the sensor only temporarily comes into contact with liquid, the sensor is far less strained so that with the construction illustrated here, even the use of capacitive sensors is principally conceivable without having to accept the aforementioned disadvantages in their entirety.

However, a particular advantage of the device according to the invention is that according to a preferred refinement, said device can use a liquid sensor that has two temperature sensors and one temperature control element that is situated in the flow direction downstream of the first temperature sensor and is in heat conducting contact with the second temperature sensor. Such a sensor is principally known from the prior art. It is described in every detail in the German unexamined patent application DE 10 2008 004 812 A1. It functions securely and reliably and is very unsusceptible with regard to contamination. However, for secure and reliable functionality, said sensor needs a flowing medium in which the proportion or the volume flow of liquid then can be easily, efficiently and reliably detected. With conventional constructions, this is not possible. However, through the arrangement according to the invention in which the liquid sensor is arranged downstream of the valve device in the flow direction, such a construction is possible so that due to the flowing liquid/gas mixture or the flowing liquid in the region of the sensor, a secure, simple and reliable detection of the liquid portion of the fluid can be implemented.

In contrast, in another alternative embodiment of the device according to the invention it can be provided that an ultrasonic sensor is used. With the arrangement according to the invention downstream of the valve device in the flow direction, such an ultrasonic sensor, which likewise is well suited for detecting liquid in flowing media, can also very advantageously be used for a configuration of the device according to the invention.

The device according to the invention can provide according to an advantageous configuration that the water separator is arranged in an anode circuit of the fuel cell system. In particular in the anode circuit, in which exhaust gas containing residual hydrogen is present, it is of vital importance that when discharging the liquid, no gas, or only a minimal predetermined amount of gas can escape into the environment. Hereby, hydrogen emissions can be reduced and, at the same time, the loss of hydrogen that is lost to the atmosphere and cannot be converted effectively in the fuel cell into electrical energy can be minimized.

It is now possible with the device to implement a particularly advantageous and efficient method for discharging liquid water and/or gas from the water separator of a fuel cell system. According to the method according to the method according to the invention, the amount of condensate accumulating in the water separator is roughly estimated. This can be carried out, for example, based on the output of the fuel cell. It would principally also be conceivable to estimate it based on the amount of added hydrogen and/or the added air. Furthermore, instead of using an actual estimation, which can be performed, for example, via a simulation of the operation of the fuel cell, it would be conceivable to specify a value from experience and to estimate the amount of resulting condensate based on the operating time of the fuel cell system. Appropriate weightings of the time with the output and so forth for refinement of the estimated value are also conceivable and possible. The individual aspects can be combined with each other as desired.

As soon as the estimated amount of condensate has a reached a predetermined limit value, the valve device of the device is opened. Thereafter, in essence, three cases are differentiated.

If no liquid water is detected at the sensor, the estimate was obviously wrong. The valve device is closed again immediately. In doing so, a small amount of gas and therefore of hydrogen is typically lost since for recording the measured value of the sensor and for subsequently closing the valve device, a certain amount of time elapses during which gas flows out through the valve device. However, this amount is very manageable. Moreover, this situation only occurs if a comparatively serious miscalculation of the amount of condensate produced has been performed. Such a situation during a normal operation thus is extremely rare.

In the second case, the sensor detects liquid water, wherein the valve device remains open if a volume flow of liquid water is above a predetermined limit value. In this case, it shall be possible to discharge water as desired. If, the volume flow of liquid water detected by the liquid sensor is already smaller than this predetermined limit during the first detection or in the course of time, which is the third case, the valve device is closed again since in this case only a comparatively small amount of residual water flows out of the water separator.

From the time the valve device is closed again, the estimation of the accumulating amount of condensate restarts again and the method starts from the beginning. With this method, in particular when using a sensor having two temperature sensors and a temperature control element in the manner described above, a secure and reliable method can be implemented which, during normal operation, operates with minimal hydrogen emissions and ensures reliable discharging of water from the water separator. Through this, the fuel cell system can be securely operated without liquid water penetrating into undesired regions and, for example, wetting active surfaces there and/or without liquid water freezing in undesired regions when turning off the fuel cell system at temperatures below the freezing point.

BRIEF DESCRIPTION OF THE SEVERAL VIEWS OF THE DRAWINGS

Further advantageous configurations of the device according to the invention arise from the respective dependent sub-claims and become apparent based on the exemplary embodiment which is described in greater detail below with reference to the figures.

In the figures.

DETAILED DESCRIPTION OF THE INVENTION

Figure 1:
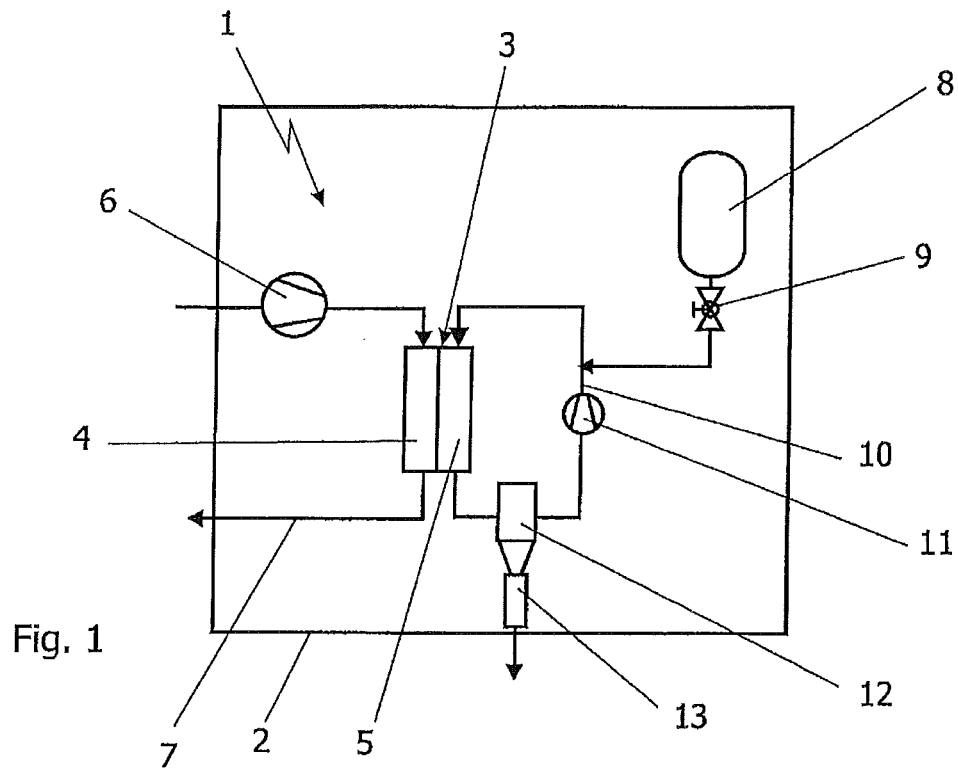
FIG. 1 shows a schematically indicated fuel cell system in a vehicle.

In the illustration of FIG. 1, a greatly schematized fuel cell system 1 is shown in a schematically indicated vehicle 2. The fuel cell system 1 serves for providing electrical power for the vehicle 2, in particular driving power for the vehicle 2. It consists substantially of a fuel cell 3 which has a cathode chamber 4 and an anode chamber 5. The cathode chamber 4 is supplied in a manner known per se with air as oxygen supplier via an air supply device 6. The exhaust air leaves the system again via an exhaust air line 7. For simplifying the illustration, further components which are generally known and common in the region of air supply such as, for example, air filter, humidifiers and the like are omitted. This applies also to components in the region of the exhaust air line, for example a turbine for recovering residual energy in the exhaust air.

The anode chamber 5 of the fuel cell 3 is supplied with hydrogen from a compressed gas storage 8 via a pressure control and metering device 9. Hydrogen that has not been consumed returns in a manner known per se downstream of the anode chamber 5 via a recirculation line 10 by means of a recirculation feed device 11 to the inlet of the anode chamber 5 and is mixed with fresh hydrogen and fed again into the anode chamber 5. In the region of this so-called anode circulation, water and inert gas accumulates over time. The water is the product water from the fuel cell 3, wherein here only a small portion of the product water is produced in the region of the anode chamber, and the largest portion is produced in the region of the cathode chamber 4. The inert gas typically is nitrogen which diffuses through the membranes of the fuel cell 3, which is constructed as a PEM fuel cell, and accumulates in the region of the anode circuit. Water and gas have to be discharged from time to time. For this purpose, combined lines or separate lines for discharging gas and for discharging water can be provided. For the present invention, only discharging of water is of interest so that hereinafter only this aspect is further discussed. For discharging the liquid water from the gas in the recirculation line 10, a water separator 12 is provided in the fuel cell system 1 illustrated here. The liquid water is discharged via a device 13 for discharging water into the surrounding area of the vehicle 2. Likewise, it could be discharged into the exhaust air flow and could be vaporized and/or atomized therein. Storing and/or reusing the water in the vehicle 2 is also possible.

Figures 2, 3:
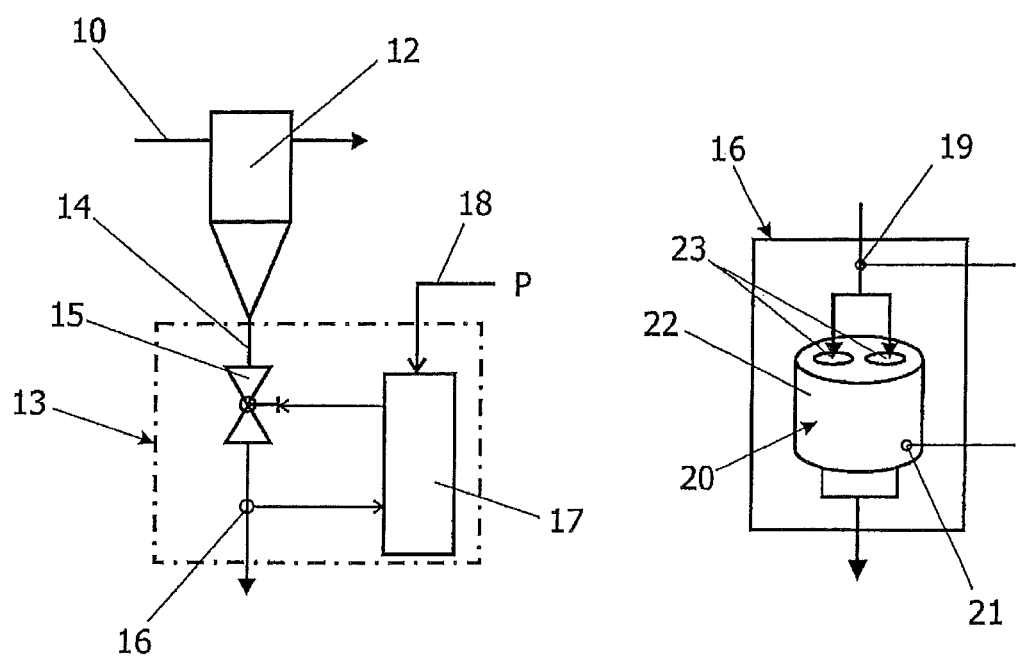
FIG. 2 shows a device according to the invention.
FIG. 3 shows an exemplary embodiment of the liquid sensor according to the invention.

The invention here is the device 13 for discharging the liquid water. Said device is indicated only as a box in the illustration of FIG. 1. In the illustration of FIG. 2, a specific construction of the device 13 according to the invention is illustrated. Again, the water separator 12 and a portion of the recirculation line 10 can be seen. In the direction of gravity, a line element 14 extends at the bottom out of the water separator 12, in the region of which line element the device 13 is arranged, which is bordered here by a dotdashed line. In the flow direction of the water, the device consists of a valve device 15 and a liquid sensor 16. Moreover, it comprises a control unit 17. The functionality includes that the presence of liquid is detected via the liquid sensor 16. This is reported to the control unit 17. The liquid sensor 16 is able of distinguishing between no liquid present and at least two different amounts of liquid in the discharged fluid. The amount of liquid above a predetermined limit value is designated hereinafter as large amount of liquid and the amount below a predetermined limit value is designated as small amount of liquid. It is always possible in the region of the discharge line 14 that both liquid and gas, or only liquid or only gas are/is present.

In order to be able to eliminate failure-prone level sensors in the region of the water separator 12, the control unit 17 estimates the amount of accumulated product water or condensate. This can in particular be added up or integrated over time based on the electrical power P of the fuel cell 3.

This is indicated in the illustration of FIG. 2 by the arrow 18 marked with P which delivers corresponding data to the control unit 17. As soon as this estimate detects in the water separator 12 an estimated amount of liquid or condensate which lies above a predetermined limit value and therefore requires the liquid separator 12 to be emptied, the valve device 15 is opened by the control unit 17. At the same time, the estimate of the amount of condensate is set to "zero" again. After opening the valve device 15, in essence, three different states can be detected.

The first state, which typically occurs rarely during normal operation since it assumes that a wrong estimate of the accumulated amount of condensate was performed, would be the state in which no liquid is present in the region of the liquid sensor 16. In this case, the control unit 17 will immediately close the valve device 15 again. Only the length of the line between the valve device 15 and the liquid sensor 16 and a potential time delay for recording the measured value of the liquid sensor 16 will then cause the discharge of a small amount of gas. However, this amount is typically very small and can be tolerated, even if it contains hydrogen or residual hydrogen. Moreover, as mentioned above, this situation occurs in normal operation only if a wrong estimate of the amount of water has occurred, which typically does not happen very often.

The second possible case is that a large volume flow of liquid water according to the above-mentioned definition is detected. In this case, the valve device 15 remains open. In the third case, a small volume flow of liquid water is immediately detected or the volume flow of liquid water drops during the discharging from the detected large volume flow to a now detected small volume flow, and the valve device 15 is closed by the control unit 17.

Whenever the valve device 15 is closed, regardless for which reason, the estimate of the amount of condensate previously set to "zero" restarts and the method starts from the beginning. Except for the rarely occurring first case, escape of hydrogen into the surrounding area is securely and reliable prevented and, at the same time, secure and reliable discharging of the liquid is achieved so that flooding the fuel cell 3 and/or the recirculation line 10 by an "overflowing" water separator can be securely and reliably avoided.

A particularly suitable liquid sensor 16 is briefly described below. For this, reference is made to FIG. 3. The exact construction and the exact functionality are also described in the German unexamined patent application DE 10 2008 004 812 A1. The liquid sensor 16 consists substantially of a first temperature sensor 19 and a temperature control element 20 which is arranged in the flow direction downstream of this temperature sensor 19 and which is in heat conducting connection with the second temperature sensor 21. The temperature control element 20 comprises a base body 22. The latter can be formed in particular from a material with good heat conductivity, such as aluminum, for example. Depending on the substances used, ceramic materials or adequate coatings are also conceivable to make the base body 22 of the temperature control element 20 chemically resistant against the ingredients of the liquid. In particular, as illustrated here, the base body can have a plurality of openings 23 through which the fluid flows. The temperature control element 20, for example, can be heated or cooled to a predetermined temperature value. When the base body 22 comes into contact with the fluid, the temperature of which is known through the temperature sensor 19, the base body heats up or cools down. The resulting temperature change can be securely and reliably detected via the second temperature 21. The measurement is based here on the knowledge that the fluid has a greater heat capacity if there is a liquid phase in the fluid. Thus, the fluid effects in the liquid phase a greater change in the temperature of the base body, around which the fluid flows and the temperature of which is set by means of the temperature control element 20, as this would be the case with a fluid without the presence of a liquid phase or with a smaller proportion of liquid phase. By comparing the temperature of the fluid measured in the region of the first temperature sensor 19 with the temperature in the base body 22, which is temperature-controlled by means of the temperature control element 20 by the fluid that is fed or is flowing through and the temperature of which is measured at the temperature sensor 21, the presence of liquid thus can be detected in a simple and efficient manner. In particular, the amount of liquid contained in the fluid can be detected in a secure and reliable manner. Since this functions ideally in particular for flowing fluids, such a liquid sensor 16 is also extremely well suited for the arrangement downstream of the valve device 15, as implemented in the device 13 described here.

The invention claimed is:

1. A method for discharging liquid water and/or gas from a water separator of a fuel cell system, having a device (13) for discharging liquid water from a water separator (12) in a fuel cell system (1), having
   a valve device (15),
   a liquid sensor (16) and
   a control unit (17) which is programmed to control the valve device (15) according to steps (a)-(e) depending on measured values of the liquid sensor (16),
   wherein the liquid sensor (16) is arranged downstream of the valve device (15) in the discharge flow direction, the method comprising
   (a) roughly estimating in the control unit (17) the amount of condensate accumulating in the water separator (12),
   (b) opening the valve device (15) as soon as the estimated amount of condensate has reached a predetermined limit value, wherein
   (c) if no liquid water is detected at the liquid sensor (16), the valve device (15) is closed again immediately,
   (d) if liquid water is detected at the liquid sensor (16),
      (d)(1) the valve device (15) is kept open in the case of a volume flow of liquid water above a predetermined limit value,
      (d)(2) the valve device (15) is closed in the case of a volume flow of liquid water below a predetermined limit value or a volume flow of liquid water falling below the predetermined limit value, and
   (e) upon closing the valve device, starting again the rough estimate of the accumulating amount of condensate.

2. The method according to claim 1, wherein the rough estimate of the amount of condensate is performed based on the fuel cell electrical power (P) output.

3. The method according to claim 1, wherein at least one of the metered amount of hydrogen and the time is considered in the estimate of the amount of condensate.

4. The method according to claim 1, wherein the liquid sensor (16) has first and second temperature sensors (19, 21) and one temperature control element (20) that is situated in the discharge flow direction downstream of the first temperature sensor (19), the temperature control element (20) having a base body (22) in heat conducting contact with the second temperature sensor (21), and wherein the detection of no liquid water at the liquid sensor (16), the detection of volume flow of liquid water above a predetermined limit value at the liquid sensor (16), and the detection of a volume flow of liquid water below a predetermined limit value at the liquid sensor (16) is determined by comparing the temperature of the fluid measured at the region of the first temperature sensor (19) with the temperature in the base body (22) as measured by the second temperature sensor (21).

5. The method according to claim 4, wherein the temperature control element (20) has a base body (22) through which the fluid flows.

6. The method according to claim 4, wherein the second temperature sensor (21) has no contact with the liquid.

7. The method according to claim 5, wherein the base body (22) consists of a metallic material.

8. The method according to claim 1, wherein the liquid sensor (16) is an ultrasonic sensor.

9. The method according to claim 1, wherein the water separator (12) is arranged in an anode circuit of the fuel cell system.

10. The method according to claim 5, wherein the base body (22) consists of aluminum or an aluminum alloy.

* * * * *